(12) United States Patent
Huang

(10) Patent No.: US 10,268,715 B2
(45) Date of Patent: Apr. 23, 2019

(54) SYSTEMS AND METHODS FOR DATA PROCESSING

(71) Applicant: Tencent Technology (Shenzhen) Company Limited, Shenzhen (CN)

(72) Inventor: Yaoxian Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 781 days.

(21) Appl. No.: 14/730,326

(22) Filed: Jun. 4, 2015

(65) Prior Publication Data

US 2015/0269206 A1 Sep. 24, 2015

Related U.S. Application Data

(63) Continuation of application No. PCT/CN2014/080326, filed on Jun. 19, 2014.

(30) Foreign Application Priority Data

Jun. 25, 2013 (CN) .......................... 2013 1 0257141

(51) Int. Cl.
*G06F 17/30* (2006.01)
(52) U.S. Cl.
CPC .. *G06F 17/30324* (2013.01); *G06F 17/30156* (2013.01)
(58) Field of Classification Search
CPC .......... G06F 21/51; G06F 21/10; G06F 21/53; G06F 2221/033; G06F 21/44;

(Continued)

(56) References Cited

U.S. PATENT DOCUMENTS 7,861,157 B1 12/2010 Lemoine
8,160,883 B2 * 4/2012 Lecoeuche ........ H04M 1/72561
379/88.01

(Continued)

FOREIGN PATENT DOCUMENTS

CN 1595366 A 3/2005
CN 1851659 A 10/2006

(Continued)

OTHER PUBLICATIONS

Hongliang et al (CN102722450, Espacenet translation), Oct. 10, 2010, pp. 1-10.*

(Continued)

*Primary Examiner* — Angelica Ruiz
(74) *Attorney, Agent, or Firm* — Sughrue Mion, PLLC

(57) ABSTRACT

Systems and methods are provided for data processing. For example, first digest values associated with first contents of a plurality of first data points are calculated, the plurality of first data points including a second data point and one or more third data points; a second digest value associated with a second content of the second data point is compared with one or more third digest values associated with third contents of the third data points, the third data points preceding the second data point; in response to the second digest value being the same as a fourth digest value associated with a fourth content of a fourth data point, the second content of the second data point is deleted, the fourth data point being within the one or more third data points; and a mapping between the second digest value and the fourth content is established.

12 Claims, 7 Drawing Sheets

(58) Field of Classification Search
CPC .. G06F 21/52; G06F 21/602; G06F 17/30094; G06F 17/30206; G06F 17/30772; G06F 8/20
USPC .......... 707/600–831, 899, 999.001–999.206
See application file for complete search history.

(56) References Cited

U.S. PATENT DOCUMENTS

| | | | | |
|---|---|---|---|---|
| 2002/0156911 | A1* | 10/2002 | Croman | G06F 21/10 709/235 |
| 2003/0177132 | A1* | 9/2003 | Thomas | G06Q 10/10 |
| 2006/0222163 | A1* | 10/2006 | Bank | G06F 17/30581 379/221.08 |
| 2009/0077097 | A1* | 3/2009 | Lacapra | G06F 17/30079 |
| 2009/0106255 | A1* | 4/2009 | Lacapra | G06F 11/1076 |
| 2013/0205123 | A1* | 8/2013 | Vorbach | G06F 9/30043 712/221 |
| 2016/0188181 | A1* | 6/2016 | Smith | G06F 3/0416 715/765 |

FOREIGN PATENT DOCUMENTS

| | | |
|---|---|---|
| CN | 101719143 A | 6/2010 |
| CN | 102222085 A | 10/2011 |
| CN | 102436408 A | 5/2012 |
| CN | 102495894 A | 6/2012 |
| CN | 102722450 A | 10/2012 |
| CN | 102831127 A | 12/2012 |

OTHER PUBLICATIONS

Patent Cooperation Treaty, Written Opinion of the International Searching Authority, dated Sep. 26, 2014, in PCT/CN2014/080326.
Patent Cooperation Treaty, International Preliminary Report on Patentability, dated Dec. 29, 2015, in PCT/CN2014/080326.
Chinese Patent Office, Office Action dated Feb. 28, 2015, in Application No. 201310257141.7.
Chinese Patent Office, Office Action dated Aug. 8, 2015, in Application No. 201310257141.7.
Patent Cooperation Treaty, International Search Report, PCT/CN2014/080326, dated Sep. 26, 2014.

* cited by examiner

SYSTEMS AND METHODS FOR DATA PROCESSING

CROSS-REFERENCES TO RELATED APPLICATIONS

This application is a continuation of International Application No. PCT/CN2014/080326, with an international filing date of Jun. 19, 2014, now pending, which claims priority to Chinese Patent Application No. 201310257141.7, filed Jun. 25, 2013, both applications being incorporated by reference herein for all purposes.

BACKGROUND OF THE INVENTION

Certain embodiments of the present invention are directed to computer technology. More particularly, some embodiments of the invention provide systems and methods for information processing. Merely by way of example, some embodiments of the invention have been applied to data processing. But it would be recognized that the invention has a much broader range of applicability.

For game production or other applications, a larger number of pictures are often needed for application scenes. These pictures are usually packaged into a file. Generally, an application includes multiple files. The conventional technology often has some disadvantages. For example, there are often many duplicate scenes for a particular application, and the files of the application may include many duplicate pictures. Thus, the duplicate data may occupy a larger amount of storage space, and may demand an increased usage of memory in operation.

Hence it is highly desirable to improve the techniques for data processing.

BRIEF SUMMARY OF THE INVENTION

According to one embodiment, a method is provided for data processing. For example, first digest values associated with first contents of a plurality of first data points are calculated, the plurality of first data points including a second data point and one or more third data points; a second digest value associated with a second content of the second data point is compared with one or more third digest values associated with third contents of the third data points, the third data points preceding the second data point; in response to the second digest value being the same as a fourth digest value associated with a fourth content of a fourth data point, the second content of the second data point is deleted, the fourth data point being within the one or more third data points; and a mapping between the second digest value and the fourth content is established.

According to another embodiment, a data-processing device includes: a calculation unit, a comparison unit, a detection unit, and a mapping unit. The calculation unit is configured to calculate first digest values associated with first contents of a plurality of first data points, the plurality of first data points including a second data point and one or more third data points. The comparison unit is configured to compare a second digest value associated with a second content of the second data point with one or more third digest values associated with third contents of the third data points, the third data points preceding the second data point. The deletion unit is configured to, in response to the second digest value being the same as a fourth digest value associated with a fourth content of a fourth data point, delete the second content of the second data point, the fourth data point being within the one or more third data points. The mapping unit is configured to establish a mapping between the second digest value and the fourth content.

According to yet another embodiment, a non-transitory computer readable storage medium includes programming instructions for data processing. The programming instructions configured to cause one or more data processors to execute certain operations. For example, first digest values associated with first contents of a plurality of first data points are calculated, the plurality of first data points including a second data point and one or more third data points; a second digest value associated with a second content of the second data point is compared with one or more third digest values associated with third contents of the third data points, the third data points preceding the second data point; in response to the second digest value being the same as a fourth digest value associated with a fourth content of a fourth data point, the second content of the second data point is deleted, the fourth data point being within the one or more third data points; and a mapping between the second digest value and the fourth content is established.

For example, the systems and methods described herein are configured to classify all data points based on content sizes of the data points so that the data points with a same content size can be classified into a data-point group, and calculate and compare the digest values of the data points in a data-point group, in order to reduce the comparison time and increase memory usage efficiency.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
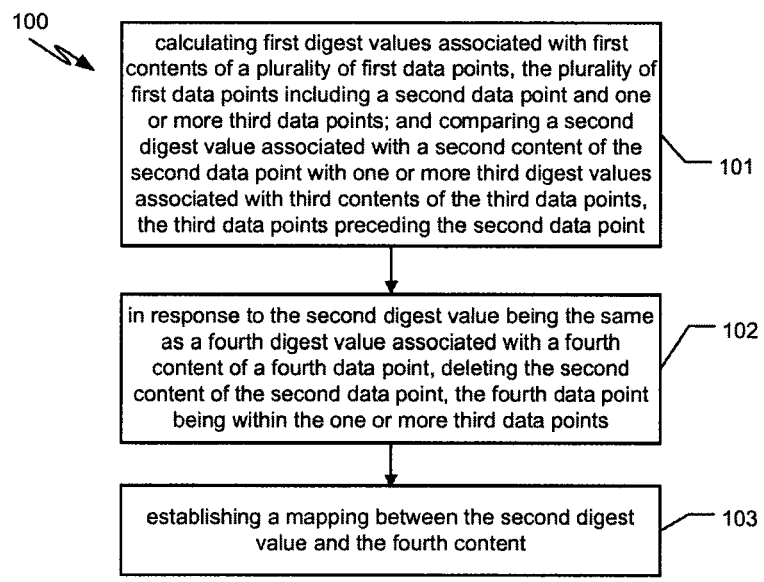
FIG. 1 is a simplified diagram showing a method for data processing according to one embodiment of the present invention.

FIG. 1 is a simplified diagram showing a method for data processing according to one embodiment of the present invention. This diagram is merely an example, which should not unduly limit the scope of the claims. One of ordinary skill in the art would recognize many variations, alternatives, and modifications. The method 100 includes at least the processes 101-103.

According to one embodiment, the process 101 includes calculating (e.g., point-by-point) first digest values associated with first contents of a plurality of first data points, the plurality of first data points including a second data point and one or more third data points; and comparing a second digest value associated with a second content of the second data point with one or more third digest values associated with third contents of the third data points, the third data points preceding the second data point. For example, a digest value is calculated using a message digest (MD4) algorithm. In another example, the digest values are compared as follows: if a present data point corresponds to a $20^{th}$ data point, the digest value of the $20^{th}$ point is compared with the digest values of the 19 data points preceding the $20^{th}$ data point.

According to another embodiment, the process 102 includes: in response to the second digest value being the same as a fourth digest value associated with a fourth content of a fourth data point, deleting the second content of the second data point, the fourth data point being within the one or more third data points. For example, if the digest value of the $20^{th}$ data point is the same as that of the $8^{th}$ data point, it indicates that the content of the $20^{th}$ data point is the same as the content of the $8^{th}$ data point. In some embodiments, if contents of multiple data points are the same, only the content of one data point is stored and the contents of other data points are deleted to save storage.

According to yet another embodiment, the process 103 includes: establishing a mapping between the second digest value and the fourth content. For example, when the digest value of the $20^{th}$ data point is the same as that of the $8^{th}$ data point, the content of the $8^{th}$ data point is deleted and the mapping between the digest value of the $20^{th}$ data point and the content of the $8^{th}$ data point is established. In this way, the data content of the $8^{th}$ data point can be called when the data content of the $20^{th}$ data point is needed.

In certain embodiments, before the process 101, the method 100 further includes: assigning a plurality of fifth data points into a data-point group based on at least information associated with content sizes of the plurality of fifth data points, the fifth data points having a same content size. For example, the process 101 includes: calculating fifth digest values associated with fifth contents of the fifth data points, the fifth data points including a sixth data point and one or more seventh data points; and comparing a sixth digest value associated with a sixth content of the sixth data point with one or more seventh digest values associated with seventh contents of the seventh data points, the seventh data points preceding the sixth data point.

In some embodiments, the process 101 includes: comparing the second digest value with the third digest values (e.g., simultaneously) when the first digest values associated with the first contents of the plurality of first data points are calculated. For example, the digest values can be compared when they are being calculated. In another example, the digest values are all calculated before comparison. In yet another example, the digest value of a present data point is compared with the digest values of the previous data points immediately after the digest value of the present data point is calculated.

In certain embodiments, before the process 101, the method 100 further includes: loading a plurality of first files associated with the first data points; detecting the first files; and in response to a second file within the first files being empty, acquiring an eighth data point associated with a name of the second file. For example, the plurality of first files associated with the first data points include: files which contain all or part of the first data points, and/or files of which the file names can be used to acquire all or part of the first data points. As an example, there are 200 data points in total associated with four files and each file corresponds to 50 data points. In one example, a loaded file may contain 50 data points. In another example, a loaded file may be an empty file and 50 data points can be acquired through a name of the loaded file.

In some embodiments, the method 100 includes: merging one or more ninth data points in a third file, ninth contents of the ninth data points not being mapped to any of the first digest values. For example, a data point corresponds to a picture, and merging data points refers to merging the pictures. As an example, there are five data points in a particular file, and the data content of one data point is mapped to a digest value of data content of any data point in another file. The remaining four data points in the particular file are merged (e.g., merging four pictures). After the four pictures are merged, a loading speed is increased during operation, in certain embodiments. For example, the loading process needs to be performed four times for the original four pictures, while the loading process needs to be performed only once for the merged picture. In another example, the number of pictures to be merged depends on the size of the pictures. In yet another example, one or more picture transfer rules can be set during the picture merging based on at least information associated with when each small picture appears in the application scene(s).

In certain embodiments, before a game can be played, all files associated with data related to the game are loaded. For example, there are 5 files, and each file includes 20 data points. Thus, there are 100 data points in total. The content sizes of these data points are detected. Four different content sizes are determined for these data points. According to the content sizes, the 100 data points are assigned to four different data-point groups, e.g., A, B, C and D. For example, each data-point group includes 25 data points. As an example, digest values of data contents of all data points in each of the four data-point groups A, B, C and D are calculated (e.g., point-by-point). With respect to the data-point group A, for example, a first digest value of data content of a first data point is calculated. After a second digest value of content of a second data point is calculated, the second digest value is compared with the first digest value. If the first digest value is different from the second digest value, a third digest value of content of a third data point is calculated. If the first digest value and the second digest value are the same, the data content of the second data point is deleted and a mapping between the second digest value of the second data point and the data content of the first data point. Thus, if the second data point is to be used, the content of the first data point is called. Similarly, after the digest value of content of the $25^{th}$ data point is calculated, the digest value of the $25^{th}$ data point is compared with the digest values associated with the previous 24 data points (e.g., the first data point to the $24^{th}$ data point).

Figure 2:
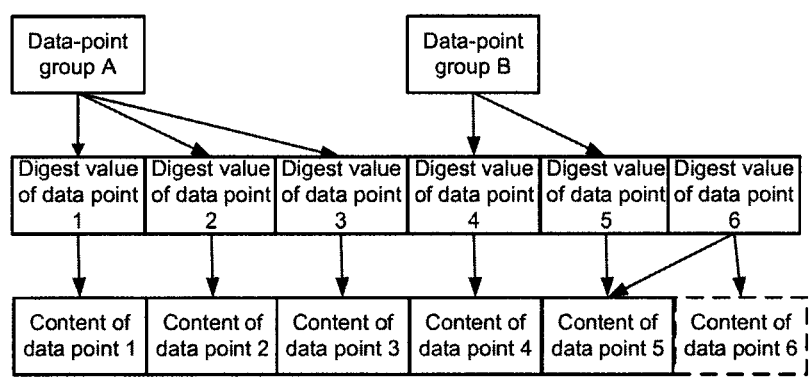
FIG. 2 is a simplified diagram showing different data-point groups according to one embodiment of the present invention.

FIG. 2 is a simplified diagram showing different data-point groups according to one embodiment of the present invention. This diagram is merely an example, which should not unduly limit the scope of the claims. One of ordinary skill in the art would recognize many variations, alternatives, and modifications. According to one embodiment, there are six data points, i.e., data point 1, data point 2, data point 3, data point 4, data point 5 and data point 6. For example, according to content sizes, data point 1, data point 2 and data point 3 are classified into data-point group A, and data point 4, data point 5 and data point 6 are classified into data-point group B. As an example, digest values of contents of data point 1, data point 2 and data point 3 in data-point group A are calculated, and the calculated digest values of data point 1, data point 2 and data point 3 are different. In another example, the digest values of contents of data point 4, data point 5 and data point 6 in data-point group B are calculated, and the digest values of the contents of data point 5 and data point 6 are the same. Hence the data content of data point 6 is deleted and a mapping is established between the digest value of data point 6 and the data content of data point 5, in some embodiments.

Figure 3:
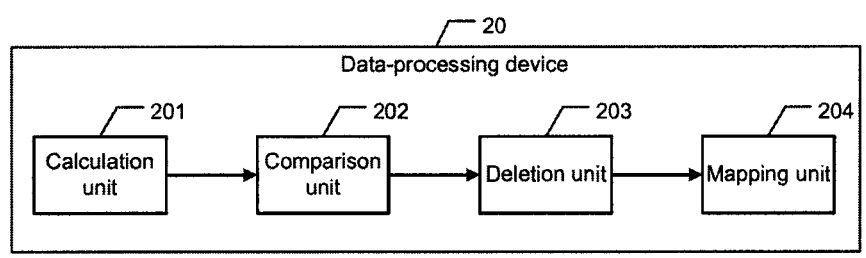
FIG. 3 is a simplified diagram showing a data-processing device according to one embodiment of the present invention.

FIG. 3 is a simplified diagram showing a data-processing device according to one embodiment of the present invention. This diagram is merely an example, which should not unduly limit the scope of the claims. One of ordinary skill in the art would recognize many variations, alternatives, and modifications. The data-processing device 20 includes a calculation unit 201, a comparison unit 202, a deletion unit 203 and a mapping unit 204.

According to one embodiment, the data-processing device 20 includes a personal computer (PC), a laptop, a personal digital assistant (PDA), a cell phone, or other suitable devices. For example, the calculation unit 201 is configured to calculate first digest values associated with first contents of a plurality of first data points, the plurality of first data points including a second data point and one or more third data points. In another example, the comparison unit 202 is configured to compare a second digest value associated with a second content of the second data point with one or more third digest values associated with third contents of the third data points, the third data points preceding the second data point. In yet another example, the deletion unit 203 is configured to, in response to the second digest value being the same as a fourth digest value associated with a fourth content of a fourth data point, delete the second content of the second data point, the fourth data point being within the one or more third data points. In yet another example, the mapping unit 204 is configured to establish a mapping between the second digest value and the fourth content.

Figure 4:
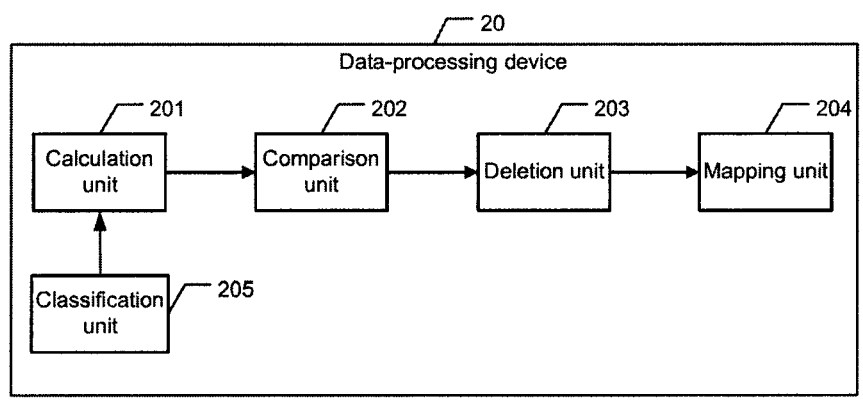
FIG. 4 is a simplified diagram showing a data-processing device according to another embodiment of the present invention.

FIG. 4 is a simplified diagram showing the data-processing device 20 according to another embodiment of the present invention. This diagram is merely an example, which should not unduly limit the scope of the claims. One of ordinary skill in the art would recognize many variations, alternatives, and modifications.

According to one embodiment, the data-processing device 20 further includes: a classification unit 205 is configured to classify data points with a same content size into one data-point group according to the content sizes of the data points. For example, the calculation unit 201 is also configured to calculate (e.g., point-by-point) digest values of data contents of all data points in each data-point group classified by the classification unit 205. In another example, the comparison unit 206 is configured to compare the digest value of the data content of a data point in a data-point group classified by the classification unit 205 with the digest value of the data content of each previous data point in the same data-point group. The comparison unit 202 is configured to, when digest values of data contents of all data points are calculated, compare the calculated digest value of the data content of a data point with the digest value of the data content of each previous data point.

Figure 5:
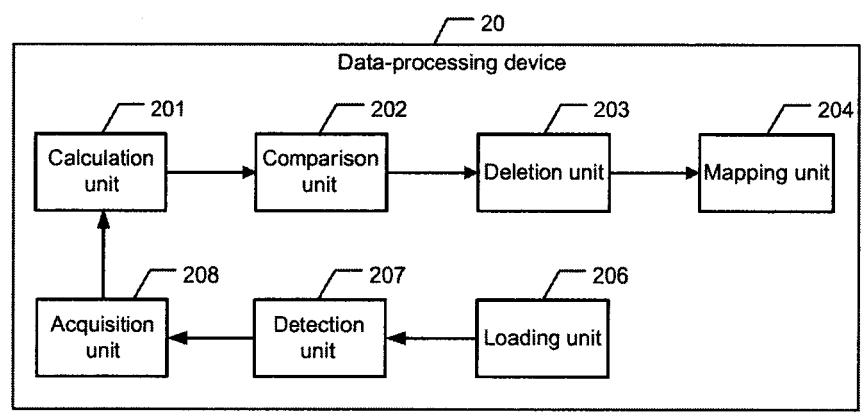
FIG. 5 is a simplified diagram showing a data-processing device according to yet another embodiment of the present invention.

FIG. 5 is a simplified diagram showing the data-processing device 20 according to yet another embodiment of the present invention. This diagram is merely an example, which should not unduly limit the scope of the claims. One of ordinary skill in the art would recognize many variations, alternatives, and modifications.

According to one embodiment, the data-processing device 20 further includes: a loading unit 206 configured to load all files relating to the data points, a detection unit 207 configured to detect all the files loaded by the loading unit 206, and an acquisition unit 208 configured to, when the detection result of the detection unit 207 shows that a file is an empty file, acquire one or more data points corresponding to a name of the empty file.

Figure 6:
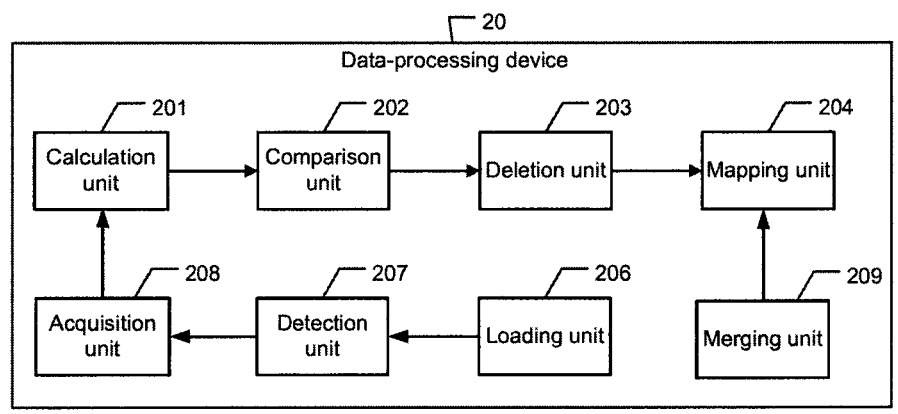
FIG. 6 is a simplified diagram showing a data-processing device according to yet another embodiment of the present invention.

FIG. 6 is a simplified diagram showing the data-processing device 20 according to yet another embodiment of the present invention. This diagram is merely an example, which should not unduly limit the scope of the claims. One of ordinary skill in the art would recognize many variations, alternatives, and modifications. According to one embodiment, the data-processing device 20 further includes: a merging unit 209 configured to merge one or more data points in a file, contents of the one or more data points not being mapped to any digest values of other data points.

Figure 7:
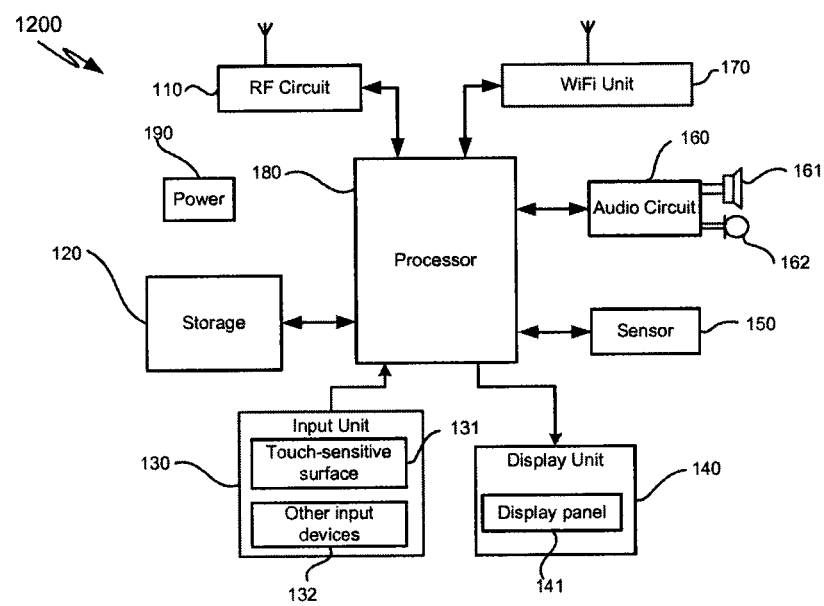
FIG. 7 is a simplified diagram showing a device for data processing according to one embodiment of the present invention.

FIG. 7 is a simplified diagram showing a device for data processing according to one embodiment of the present invention. The diagram is merely an example, which should not unduly limit the scope of the claims. One of ordinary skill in the art would recognize many variations, alternatives, and modifications. For example, the device 1200 includes a mobile phone, a tablet PC, a PDA (Personal Digital Assistant), a POS (Point of Sales terminal), a car computer or any terminal equipment.

According to one embodiment, the device 1200 (e.g., a mobile phone) includes a RF (i.e., radio frequency) circuit 110, a memory 120 that includes one or more computer-readable storage medium, an input unit 130, a display unit 140, a sensor 150, an audio circuit 160, a WiFi (i.e., wireless fidelity) module 170, one or more processors 180 that includes one or more processing cores, and a power supply 190. For example, the RF circuit 110 is configured to send/receive messages or signals in communication. As an example, the RF circuit 110 receives a base station's downlink information, delivers to the processors 180 for processing, and sends uplink data to the base station. For example, the RF circuit 110 includes an antenna, at least one amplifier, a tuner, one or several oscillators, SIM (Subscriber Identity Module) card, a transceiver, a coupler, an LNA (Low Noise Amplifier) and a duplexer. In another example, the RF circuit 110 communicates with the network and other equipments via wireless communication based on any communication standard or protocols, such as GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), etc.

According to another embodiment, the memory 120 is configured to store software programs and modules. For example, the processors 180 are configured to execute various functional applications and data processing by running the software programs and modules stored in the memory 120. The memory 120 includes a program storage area and a data storage area, where the program storage area may store the operating system, and the application(s) required by one or more functions (e.g., an audio player or a video player), in some embodiments. For example, the data storage area stores the data created based on the use of the device 1200 (e.g., audio data or a phone book). In another example, the memory 120 includes a high-speed random access storage, a non-volatile memory, one or more floppy disc storage devices, a flash storage device or other volatile solid state devices. As an example, the memory 120 further includes a memory controller to enable access to the memory 120 by the processors 180 and the input unit 130.

According to yet another embodiment, the input unit 130 is configured to receive an input number or character data and generate inputs for a keyboard, a mouse, and a joystick, optical or track signals relating to user setting and functional control. For example, the input unit 130 includes a touch-sensitive surface 131 and other input devices 132. The touch-sensitive surface 131 (e.g., a touch screen or a touch panel) is configured to receive the user's touch operations thereon or nearby (e.g., the user's operations on or near the touch-sensitive surface with a finger, a touch pen or any other appropriate object or attachment) and drive the corresponding connected devices according to the predetermined program. For example, the touch-sensitive surface 131 includes two parts, namely a touch detector and a touch controller. The touch detector detects the position of user touch and the signals arising from such touches and sends the signals to the touch controller. The touch controller receives touch data from the touch detector, converts the touch data into the coordinates of the touch point, sends the coordinates to the processors 180 and receives and executes the commands received from the processors 180. For example, the touch-sensitive surface 131 is of a resistance type, a capacitance type, an infrared type and a surface acoustic wave type. In another example, other than the touch-sensitive surface, the input unit 130 includes the other input devices 132. For example, the other input devices 132 include one or more physical keyboards, one or more functional keys (e.g., volume control keys or switch keys), a track ball, a mouse and/or a joystick.

According to yet another embodiment, the display unit 140 is configured to display data input from a user or provided to the user, and includes various graphical user interfaces of the device 1200. For example, these graphical user interfaces include menus, graphs, texts, icons, videos and a combination thereof. The display unit 140 includes a display panel 141 which contains a LCD (liquid crystal display), an OLED (organic light-emitting diode). As an example, the touch-sensitive surface can cover the display panel 141. For example, upon detecting any touch operations thereon or nearby, the touch-sensitive surface sends signals to the processors 180 to determine the type of the touch events and then the processors 180 provides corresponding visual outputs on the display panel 141 according to the type of the touch events. Although the touch-sensitive surface 131 and the display panel 141 are two independent parts for input and output respectively, the touch-sensitive surface 131 and the display panel 141 can be integrated for input and output, in some embodiments.

In one embodiment, the device 1200 includes a sensor 150 (e.g., an optical sensor, a motion sensor or other sensors). For example, the sensor 150 includes an environment optical sensor and adjusts the brightness of the display panel 141 according to the environmental luminance. In another example, the sensor 150 includes a proximity sensor and turns off or backlights the display panel when the device 1200 moves close to an ear of a user. In yet another example, the sensor 150 includes a motion sensor (e.g., a gravity acceleration sensor) and detects a magnitude of acceleration in all directions (e.g., three axes). Particularly, the sensor 150 detects a magnitude and a direction of gravity when staying still. In some embodiments, the sensor 150 is used for identifying movements of a cell phone (e.g., a switch of screen direction between horizontal and vertical, related games, and a calibration related to a magnetometer) and features related to vibration identification (e.g., a pedometer or a strike). In certain embodiments, the sensor 150 includes a gyroscope, a barometer, a hygroscope, a thermometer and/or an infrared sensor.

In another embodiment, the audio circuit 160, a speaker 161, and a microphone 162 are configured to provide an audio interface between a user and the device 1200. For example, the audio circuit 160 is configured to transmit electrical signals converted from certain audio data to the speaker that converts such electrical signals into some output audio signals. In another example, the microphone 162 is configured to convert audio signals into electrical signals which are converted into audio data by the audio circuit 160. The audio data are processed in the processors 180 and received by the RF circuit 110 before being sent to another terminal, in some embodiments. For example, the audio data are output to the memory 120 for further processing. As an example, the audio circuit 160 includes an earphone jack for communication between a peripheral earphone and the device 1200.

WiFi is a short-distance wireless transmission technology. In some embodiments, through the WiFi module 170, the device 1200 enables the user to receive and send emails, browse webpages, and/or access stream media. For example, the device 1200 is configured to provide the user with a wireless broadband Internet access. In some embodiments, the WiFi module 170 is omitted in the device 1200.

According to one embodiment, the processors 180 are the control center of the device 1200. For example, the processors 180 is connected to various parts of the device 1200 (e.g., a cell phone) via various interfaces and circuits, and executes various features of the device 1200 and processes various data through operating or executing the software programs and/or modules stored in the memory 120 and calling the data stored in the memory 120, so as to monitor and control the device 1200 (e.g., a cell phone). As an example, the processors 180 include one or more processing cores. In another example, the processors 180 is integrated with an application processor and a modem processor, where the application processor mainly handles the operating system, the user interface and the applications and the modem processor mainly handles wireless communications. In some embodiments, the modem processor is not integrated into the processors 180.

According to another embodiment, the device 1200 includes the power supply 190 (e.g., a battery) that powers up various parts. For example, the power supply 190 is logically connected to the processors 180 via a power source management system so that the charging, discharging and power consumption can be managed via the power source management system. In another example, the power supply 190 includes one or more DC or AC power sources, a recharging system, a power-failure-detection circuit, a power converter, an inverter, a power source state indicator, or other components. In yet another example, the device 1200 includes a camcorder, a Bluetooth module, etc. Specifically, the processors 180 of the device 1200 load executable files associated with one or more applications to the memory 120 and run the applications stored in the memory 120 according to the method 100.

According to one embodiment, a method is provided for data processing. For example, first digest values associated with first contents of a plurality of first data points are calculated, the plurality of first data points including a second data point and one or more third data points; a second digest value associated with a second content of the second data point is compared with one or more third digest values associated with third contents of the third data points, the third data points preceding the second data point; in response to the second digest value being the same as a fourth digest value associated with a fourth content of a fourth data point, the second content of the second data point is deleted, the fourth data point being within the one or more third data points; and a mapping between the second digest value and the fourth content is established. For example, the method is implemented according to at least FIG. 1.

According to another embodiment, a data-processing device includes: a calculation unit, a comparison unit, a detection unit, and a mapping unit. The calculation unit is configured to calculate first digest values associated with first contents of a plurality of first data points, the plurality of first data points including a second data point and one or more third data points. The comparison unit is configured to compare a second digest value associated with a second content of the second data point with one or more third digest values associated with third contents of the third data points, the third data points preceding the second data point. The deletion unit is configured to, in response to the second digest value being the same as a fourth digest value associated with a fourth content of a fourth data point, delete the second content of the second data point, the fourth data point being within the one or more third data points. The mapping unit is configured to establish a mapping between the second digest value and the fourth content. For example, the device is implemented according to at least FIG. 3, FIG. 4, FIG. 5, and/or FIG. 6.

According to yet another embodiment, a non-transitory computer readable storage medium includes programming instructions for data processing. The programming instructions configured to cause one or more data processors to execute certain operations. For example, first digest values associated with first contents of a plurality of first data points are calculated, the plurality of first data points including a second data point and one or more third data points; a second digest value associated with a second content of the second data point is compared with one or more third digest values associated with third contents of the third data points, the third data points preceding the second data point; in response to the second digest value being the same as a fourth digest value associated with a fourth content of a fourth data point, the second content of the second data point is deleted, the fourth data point being within the one or more third data points; and a mapping between the second digest value and the fourth content is established. For example, the storage medium is implemented according to at least FIG. 1.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for data processing comprising:
   calculating first digest values associated with first contents of a plurality of first data points, the plurality of first data points including a second data point and one or more third data points;
   comparing a second digest value associated with a second content of the second data point with one or more third digest values associated with third contents of the one or more third data points, the one or more third data points preceding the second data point;
   in response to the second digest value being the same as a fourth digest value associated with a fourth content of a fourth data point, deleting the second content of the second data point, the fourth data point being within the one or more third data points; and
   establishing a mapping between the second digest value and the fourth content,
   wherein the method further comprises:
      classifying data points into a plurality of data-point groups according to different content sizes of the data points, the classified data points for each data-point group having a same content size; and
      assigning a plurality of fifth data points into a given data-point group, and
   wherein the comparing is performed between digest values of contents of the plurality of fifth data points that belong to the given data-point group, and not performed between a digest value of a content of a fifth data point and a digest value of a content of a data point that belongs to another data-point group.

2. The method of claim 1, wherein the calculating and the comparing comprise:
   calculating fifth digest values associated with fifth contents of the plurality of fifth data points, the plurality of fifth data points including a sixth data point and one or more seventh data points; and
   comparing a sixth digest value associated with a sixth content of the sixth data point with one or more seventh digest values associated with seventh contents of the one or more seventh data points, the one or more seventh data points preceding the sixth data point.

3. The method of claim 1, wherein the calculating and the comparing comprise:
   comparing the second digest value with the one or more third digest values when the first digest values associated with the first contents of the plurality of first data points are calculated.

4. The method of claim 1, further comprising:
   loading a plurality of first files associated with the plurality of first data points;
   detecting the plurality of first files; and
   in response to a second file within the plurality of first files being empty, acquiring an eighth data point associated with a name of the second file.

5. The method of claim 4, further comprising:
   merging one or more ninth data points in a third file, ninth contents of the one or more ninth data points not being mapped to any of the first digest values.

6. A data-processing device comprising:
   a calculation unit configured to calculate first digest values associated with first contents of a plurality of first data points, the plurality of first data points including a second data point and one or more third data points;
   a comparison unit configured to compare a second digest value associated with a second content of the second data point with one or more third digest values associated with third contents of the one or more third data points, the one or more third data points preceding the second data point;
   a deletion unit configured to, in response to the second digest value being the same as a fourth digest value associated with a fourth content of a fourth data point, delete the second content of the second data point, the fourth data point being within the one or more third data points; and
   a mapping unit configured to establish a mapping between the second digest value and the fourth content,
   wherein the device further comprises a classification unit configured to classify data points into a plurality of data-point groups according to different content sizes of the data points, the classified data points for each data-point group having a same content size, and the classification unit further configured to assign a plurality of fifth data points into a given data-point group, and
   wherein the comparison unit is configured to compare between digest values of contents of the plurality of fifth data points that belong to the given data-point group, and not compare between a digest value of a content of a fifth data point and a digest value of a content of a data point that belongs to another data-point group.

7. The device of claim 6, wherein:
   the calculation unit is further configured to calculate fifth digest values associated with fifth contents of the plurality of fifth data points, the plurality of fifth data points including a sixth data point and one or more seventh data points; and
   the comparison unit is configured to compare a sixth digest value associated with a sixth content of the sixth data point with one or more seventh digest values associated with seventh contents of the one or more seventh data points, the one or more seventh data points preceding the sixth data point.

8. The device of claim 6, wherein:
   the comparison unit is configured to compare the second digest value with the one or more third digest values when the first digest values associated with the first contents of the plurality of first data points are calculated.

9. The device of claim 6, further comprising:
a loading unit configured to load a plurality of first files associated with the plurality of first data points;
a detection unit configured to detect the plurality of first files; and
an acquisition unit configured to, in response to a second file within the plurality of first files being empty, acquire an eighth data point associated with the second file.

10. The device of claim 9, further comprising:
a merging unit configured to merge one or more ninth data points in a third file, ninth contents of the one or more ninth data points not being mapped to any of the first digest values.

11. The device of claim 9, further comprising:
one or more data processors; and
a non-transitory computer-readable storage medium,
wherein one or more of the calculation unit, the comparison unit, the detection unit, and the mapping unit are stored in the non-transitory computer-readable storage medium and configured to be executed by the one or more data processors.

12. A non-transitory computer readable storage medium comprising programming instructions for data processing, the programming instructions configured to cause one or more data processors to execute operations comprising:
calculating first digest values associated with first contents of a plurality of first data points, the plurality of first data points including a second data point and one or more third data points;
comparing a second digest value associated with a second content of the second data point with one or more third digest values associated with third contents of the one or more third data points, the one or more third data points preceding the second data point;
in response to the second digest value being the same as a fourth digest value associated with a fourth content of a fourth data point, deleting the second content of the second data point, the fourth data point being within the one or more third data points; and
establishing a mapping between the second digest value and the fourth content,
wherein the programming instructions are further configured to cause the one or more data processors to:
classify data points into a plurality of data-point groups according to different content sizes of the data points, the classified data points for each data-point group having a same content size; and
assign a plurality of fifth data points into a given data-point group, and
wherein the comparing is performed between digest values of contents of the plurality of fifth data points that belong to the given data-point group, and not performed between a digest value of a content of a fifth data point and a digest value of a content of a data point that belongs to another data-point group.

* * * * *